United States Patent
Hirano

(10) Patent No.: US 8,311,405 B2
(45) Date of Patent: Nov. 13, 2012

(54) IMAGE CAPTURE DEVICE WITH ZOOM LENS

(75) Inventor: Shintaro Hirano, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 12/716,435

(22) Filed: Mar. 3, 2010

(65) Prior Publication Data

US 2010/0226635 A1     Sep. 9, 2010

(30) Foreign Application Priority Data

Mar. 5, 2009   (JP) ................. 2009-051754

(51) Int. Cl.
G03B 17/00    (2006.01)

(52) U.S. Cl. ...................... 396/87; 348/240.3

(58) Field of Classification Search ............ 396/87; 348/240.3

See application file for complete search history.

(56) References Cited

U.S. PATENT DOCUMENTS

| | | | | |
|---|---|---|---|---|
| 4,843,475 A | * | 6/1989 | Imai | 348/240.3 |
| 6,002,888 A | * | 12/1999 | Miyamoto et al. | 396/284 |
| 6,097,548 A | * | 8/2000 | Funahashi et al. | 359/694 |
| 2002/0135902 A1 | * | 9/2002 | Nomura et al. | 359/819 |
| 2002/0146246 A1 | * | 10/2002 | Miyazaki | 396/79 |
| 2004/0008422 A1 | | 1/2004 | Ohkawara | |
| 2004/0033070 A1 | * | 2/2004 | Haraguchi et al. | 396/84 |
| 2004/0056974 A1 | * | 3/2004 | Kitajima et al. | 348/335 |
| 2005/0243444 A1 | * | 11/2005 | Takeshita et al. | 359/819 |
| 2005/0249489 A1 | | 11/2005 | Ohkawara | |
| 2006/0002697 A1 | * | 1/2006 | Terashima | 396/85 |
| 2008/0192138 A1 | * | 8/2008 | Higashiyama et al. | 348/345 |

FOREIGN PATENT DOCUMENTS

| | | |
|---|---|---|
| JP | 2001-264615 A | 9/2001 |
| JP | 2004-048160 A | 2/2004 |
| JP | 2005-091782 A | 4/2005 |
| JP | 2005-106848 A | 4/2005 |

* cited by examiner

*Primary Examiner* — Christopher Mahoney
*Assistant Examiner* — Fang-Chi Chang
(74) *Attorney, Agent, or Firm* — Westerman, Hattori, Daniels & Adrian, LLP

(57) ABSTRACT

An image capture device of the present invention includes: a zoom lens being caused by the operation of the zoom mechanism to move along the optical axis; an information acquisition part which acquires information about the amount of movement determined by the amount of movement of the zoom lens; a power supply part which supplies power to the information acquisition part; a controller which controls power supply; and a state detection part which detects a specific halt state in which the zoom mechanism stops the movement of the zoom lens when the zoom mechanism is in a predetermined operating position, the predetermined operating position being such that the zoom lens hardly changes its position despite the action of external force. The controller stops power supply from the power supply part to the information acquisition part when the state detection part detects the specific halt state.

5 Claims, 8 Drawing Sheets

IMAGE CAPTURE DEVICE WITH ZOOM LENS

The Japanese application Number 2009-051754, upon which this patent application is based, is hereby incorporated by reference.

BACKGROUND OF THE INVENTION

1. Field of the Invention

The present invention relates to an image capture device with a zoom lens provided to a device body through a zoom mechanism.

2. Description of Related Art

In a conventionally used image capture device with a zoom lens (hereinafter referred to as a zoom-type image capture device), the zoom lens is provided to a device body through a zoom mechanism. The zoom mechanism includes a lens barrel to which the zoom lens is fixed, and a motor for causing the lens barrel to move back and forth along the optical axis of the zoom lens. An operational button for operating the zoom mechanism is provided to the device body of the zoom-type image capture device. Pressing the operational button supplies power to the motor to cause the motor to rotate, thereby causing the lens barrel of the zoom mechanism to move back and forth along the optical axis. As a result, the zoom lens moves back and forth along its optical axis, so that a captured image is zoomed in or out.

The motor includes a photointerrupter provided to part of the shaft or the transmission mechanism of the motor, and which can count the number of optical pulses determined by the amount of rotation of the motor. The counted number supplied from the photointerrupter is given to a controller incorporated in the zoom-type image capture device. The controller knows the position of the zoom lens based on the counted number acquired from the photointerrupter.

Now, it is assumed that external force acts on the zoom mechanism when power supply to the motor stops. In this case, the motor is caused to rotate by the action of the external force even though power supply to the motor stops, by which the lens barrel of the zoom mechanism may disadvantageously move along the optical axis. If power supply to the photointerrupter also stops at this time, the photointerrupter cannot count the number of optical pulses determined by the amount the motor rotated as a result of the action of the external force. This falls short of reaching a counted number required for the controller to know the precise position of the zoom lens. As a result, the actual position of the zoom lens deviates from the position of the zoom lens the controller knows.

The above-described zoom-type image capture device performs focusing based on a counted number acquired from the photointerrupter. So, shortage in a counted number due to failing to incorporate the amount the motor rotated as a result of the action of external force results in incorrect focus. Besides, the zoom lens may go out of its originally supposed movable region, by which the zoom-type image capture device may be mechanically damaged.

In response, it has been suggested that power be supplied to the photointerrupter even when power supply to the motor stops. In this structure, even when the lens barrel of the zoom mechanism is caused to move along the optical axis by the action of external force to cause the motor to rotate, the photointerrupter can count the number of optical pulses determined by the amount the motor rotated as a result of the action of the external force. So, the controller can know the precise position of the zoom lens.

In the conventionally used image capture device, however, the photointerrupter should be in a ready state to count the number of optical pulses determined by the amount of rotation of the motor when the zoom-type image capture device is ON, meaning that the photointerrupter always consumes power. This reduces the number of images that can be captured without requiring change of a battery (dry cell battery or rechargeable battery) in the zoom-type image capture device.

SUMMARY OF THE INVENTION

A first aspect of an image capture device of the present invention includes: a zoom lens provided to a device body through a zoom mechanism, the zoom lens being caused by the operation of the zoom mechanism to move back and forth along the optical axis of the zoom lens; an information acquisition part which acquires information about the amount of movement determined by the amount of movement of the zoom lens; a power supply part which supplies power to the information acquisition part; a controller which controls power supply from the power supply part to the information acquisition part; and a state detection part which detects a specific halt state in which the zoom mechanism stops the movement of the zoom lens when the zoom mechanism is in a predetermined operating position, the predetermined operating position being such that the zoom lens hardly changes its position despite the action of external force. The controller stops power supply from the power supply part to the information acquisition part when the state detection part detects the specific halt state.

In the image capture device of the first aspect, the information acquisition part acquires information about the amount of movement determined by the amount of movement of the zoom lens when the zoom lens moves. Then, the position of the zoom lens is known based on the acquired information about the amount of movement. So, the information acquisition part should be in a ready state to acquire the information about the amount of movement when there is a fear of the position of the zoom lens being changed by the action of external force.

In the specific halt state in which the zoom mechanism stops at the predetermined operating position, however, the zoom lens hardly changes its position despite the action of the external force. So, it is very unlikely that the information acquisition part will acquire the information about the amount of movement. Thus, in this case, there will be no shortage in the information about the amount of movement required to know the position of the zoom lens even when the information acquisition part is not placed in a ready state to acquire the information about the amount of movement.

As described, in the capture device of the first aspect, power supply from the power supply part to the information acquisition part is stopped in the specific halt state in which the zoom mechanism stops at the predetermined operating position. This reduces power to be consumed by the information acquisition part.

According to a second aspect of the image capture device of the present invention, the image capture device of the first aspect further includes an operational part which gives instructions to operate the zoom mechanism. The state detection part includes: a storage part containing position information stored in advance therein, the position information indicating the position of the zoom lens when the zoom mechanism is in the predetermined operating position; and a determination part which determines whether or not the zoom mechanism has reached the predetermined operating position based on the information about the amount of movement acquired from the information acquisition part and the position information stored in the storage part, the determination being made when the operational part gives instructions to stop the operation of the zoom mechanism. When the determination part determines that the zoom mechanism has reached the predetermined operating position, the state detection part detects this state as the specific halt state.

In the image capture device of the second aspect, when the operational part gives instructions to stop the zoom mechanism, the state detection part makes the determination part determine whether or not the zoom mechanism has reached the predetermined operating position based on the information about the amount of movement acquired from the information acquisition part and the position information stored in the storage part. When the determination part determines that the zoom mechanism has reached the predetermined operating position, the state detection part detects this state as the specific halt state. In this case, the controller stops power supply from the power supply part to the information acquisition part.

In contrast, when the determination part determines that the zoom mechanism has not reached the predetermined operating position, the state detection part does not detect the specific halt state. In this case, the controller maintains power supply from the power supply part to the information acquisition part.

When the operational part gives instructions to operate the zoom mechanism, the controller supplies power from the power supply part to the information acquisition part.

In the image capture device of the second aspect, power supply from the power supply part to the information acquisition part is stopped in the specific halt state in which the zoom mechanism stops at the predetermined operating position. In states except the specific halt state, power is supplied from the power supply part to the information acquisition part. So, there will be no shortage in the information about the amount of movement required to know the position of the zoom lens. Further, power to be consumed by the information acquisition part is reduced.

According to a third aspect of the image capture device of the present invention, in the image capture device of the first or second aspect, the zoom mechanism includes a lens barrel to which the zoom lens is fixed. The lens barrel is capable of rotating about the optical axis of the zoom lens while being capable of moving back and forth along the optical axis. The device body and the lens barrel are coupled to each other by a cam mechanism having a cam curve. The cam curve defines the change of the operating position of the zoom mechanism determined by the amount of rotation of the lens barrel about the optical axis.

In the image capture device of the third aspect, the cam curve of the cam mechanism defines the predetermined operating position of the zoom mechanism.

According to a fourth aspect of the image capture device of the present invention, in the image capture device of any one of the first to third aspects, the controller stops power supply from the power supply part to the information acquisition part when the zoom lens has reached at least a wide end or a telephoto end.

According to a fifth aspect of the image capture device of the present invention, in the image capture device of any one of the first to fourth aspects, the zoom lens is caused to move back and forth along the optical axis of the zoom lens by driving of a motor. The information acquisition part includes a pulse encoder for acquiring the number of pulses determined by the amount of rotation of the motor. The acquired number of pulses serves as the information about the amount of movement.

BRIEF DESCRIPTION OF THE DRAWINGS

FIG. 2 is a perspective view showing the condition of the zoom-type image capture device when a captured image is zoomed in;

DETAILED DESCRIPTION OF THE EMBODIMENTS

A preferred embodiment of the present invention is described in detail below with reference to drawings.

Figure 1:
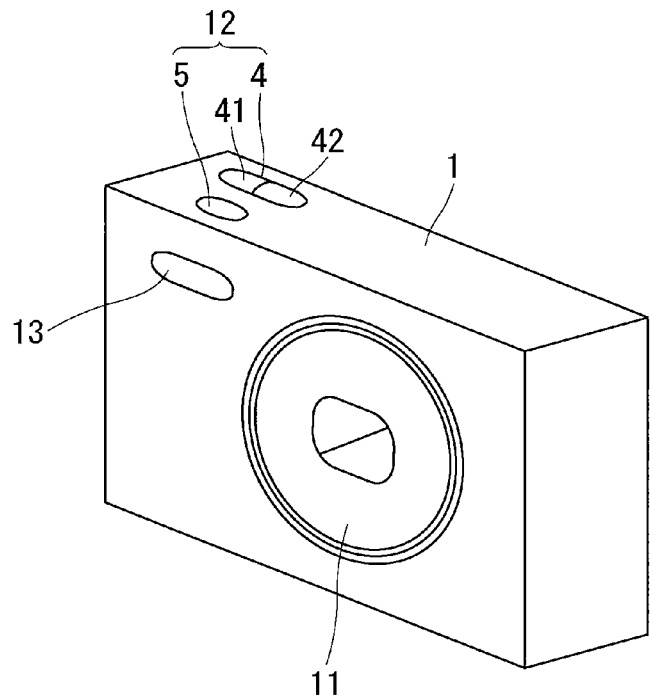
FIG. 1 is a perspective view of an image capture device with a zoom lens (zoom-type image capture device) according to a preferred embodiment of the present invention.

As shown in FIG. 1, an image capture device with a zoom lens (zoom-type image capture device) of the preferred embodiment of the present invention has a device body 1 that includes: an image capture mechanism 11 for admitting light from a target of image capture; an operational button 12 for operating the zoom-type image capture device; and a light emission mechanism 13 for emitting light at the time of image capture to illuminate a target of image capture. A release button is not illustrated in the figures, and is not described in the present preferred embodiment.

Figure 9:
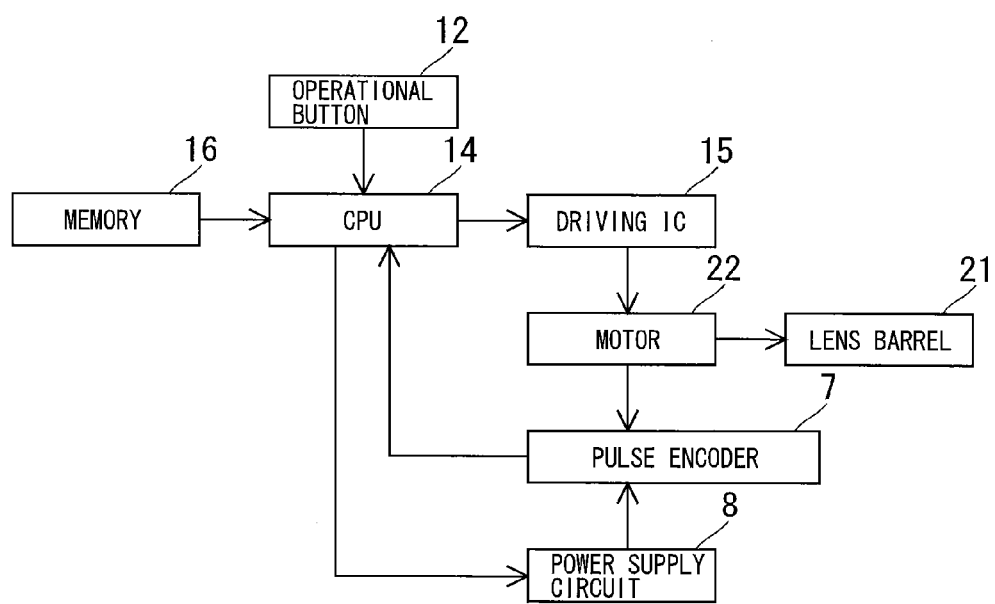
FIG. 9 is a block diagram of the zoom-type image capture device.

As shown in FIG. 9, the device body 1 further includes: a CPU (central processing unit) 14 for controlling the operation of the zoom-type image capture device; a driving IC (integrated circuit) 15 for driving the image capture mechanism 11; a memory 16 for storing therein various types of data including those of captured images and those required for control; a pulse encoder 7; and a power supply circuit 8 for supplying power to the pulse encoder 7.

Figure 2:
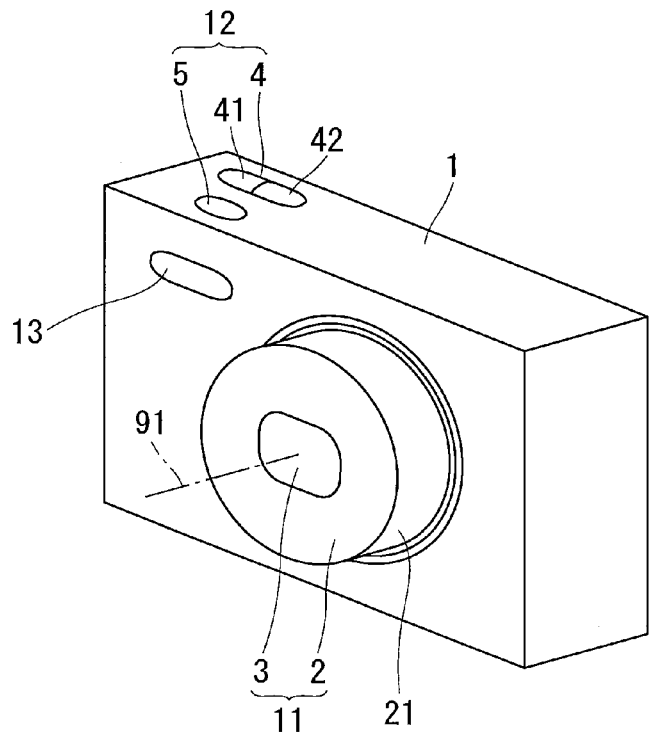

The image capture mechanism 11 includes a zoom mechanism 2 with a lens barrel 21, and a zoom lens 3 fixed to the lens barrel 21 as shown in FIG. 2. The zoom mechanism 2 further has a motor 22 shown in FIG. 3. The motor 22 has a rotary shaft 221 the tip of which is provided with a gear 222 for applying the torque of the motor 22 to the lens barrel 21 to cause the lens barrel 21 to rotate about an optical axis 91 of the zoom lens 3. That is, the lens barrel 21 rotates about the optical axis 91 in response to the rotation of the motor 22.

Figure 5:
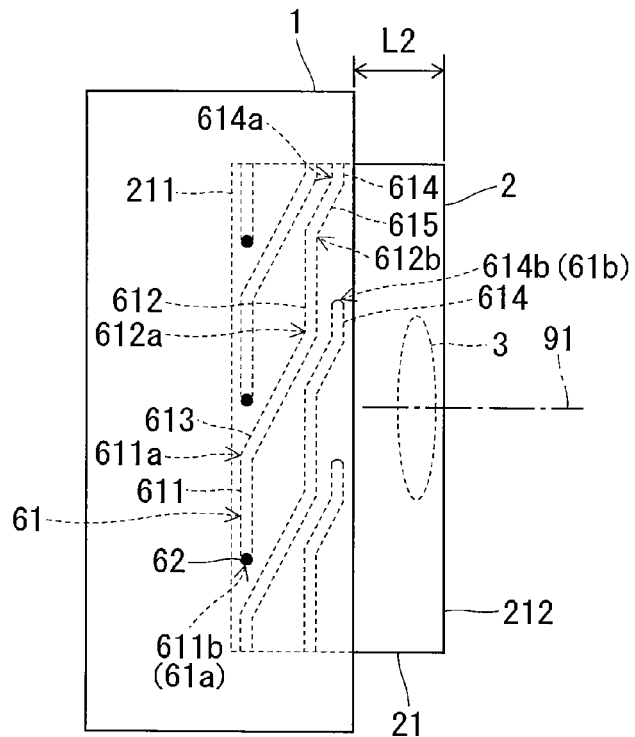
FIG. 5 is a side view of the zoom-type image capture device when a zoom lens stops at a telephoto end.

The device body 1 and the lens barrel 21 are coupled to each other by a cam mechanism. As shown in FIG. 5, the cam mechanism is formed from a plurality of guide slots 61 defined in the side wall of the lens barrel 21, and protrusions 62 formed inside the device body 1 and which are provided in one-to-one relationship with the guide slots 61. Each protrusion 62 is slidably engaged with the corresponding guide slot 61. So, the protrusion 62 relatively moves with respect to the lens barrel 21 in response to the operation of the lens barrel 21. In the below, the relative movement of the protrusion 62 with respect to the lens barrel 21 is simply referred to as the relative movement of the protrusion 62.

The guide slot 61 is defined by a first slot section 611, a second slot section 612, a third slot section 613, a fourth slot section 614, and a fifth slot section 615.

The first slot section 611 is defined in a position near a base end 211 of the lens barrel 21, and extends a certain distance along the circumference of the optical axis 91 in a direction parallel to the base end 211, or in a direction slightly slanting from the base end 211. The second slot section 612 is defined in a position which is shifted around the circumference of the optical axis 91 from the first slot section 611 belonging to the same guide slot 61, and which is closer to a front end 212 of the lens barrel 21 than the first slot section 611. The second slot section 612 extends a certain distance along the circumference of the optical axis 91 in a direction parallel to the base end 211, or in a direction slightly slanting from the base end 211. The third slot section 613 is defined to communicatively couple the first slot section 611 and the second slot section 612, and extends obliquely from an end 611a of the first slot section 611 to an end 612a of the second slot section 612.

The fourth slot section 614 is defined in a position which is shifted around the circumference of the optical axis 91 from the second slot section 612 belonging to the same guide slot 61, and which is closer to the front end 212 of the lens barrel 21 than the second slot section 612. The fourth slot section 614 extends a certain distance along the circumference of the optical axis 91 in a direction parallel to the base end 211, or in a direction slightly slanting from the base end 211. The fifth slot section 615 is defined to communicatively couple the second slot section 612 and the fourth slot section 614, and extends obliquely from an end 612b of the second slot section 612 to an end 614a of the fourth slot section 614.

The end 611b of the first slot section 611 and the end 614b of the fourth slot section 614 respectively serve as opposite ends 61a and 61b of the guide slot 61.

In the cam mechanism described above, when the protrusion 62 is placed at the end 61a of the guide slot 61 as shown in FIG. 5, the lens barrel 21 of the zoom mechanism 2 has an operating position with which the amount of projection of the lens barrel 21 from the front surface of the device body 1 becomes maximum. In the present preferred embodiment, the zoom rate of an image to be captured at this time is set highest. So, the position of the zoom lens 3 then in the direction of the optical axis 91 (hereinafter simply referred to as the position of the zoom lens 3) is a telephoto end.

Figure 7:
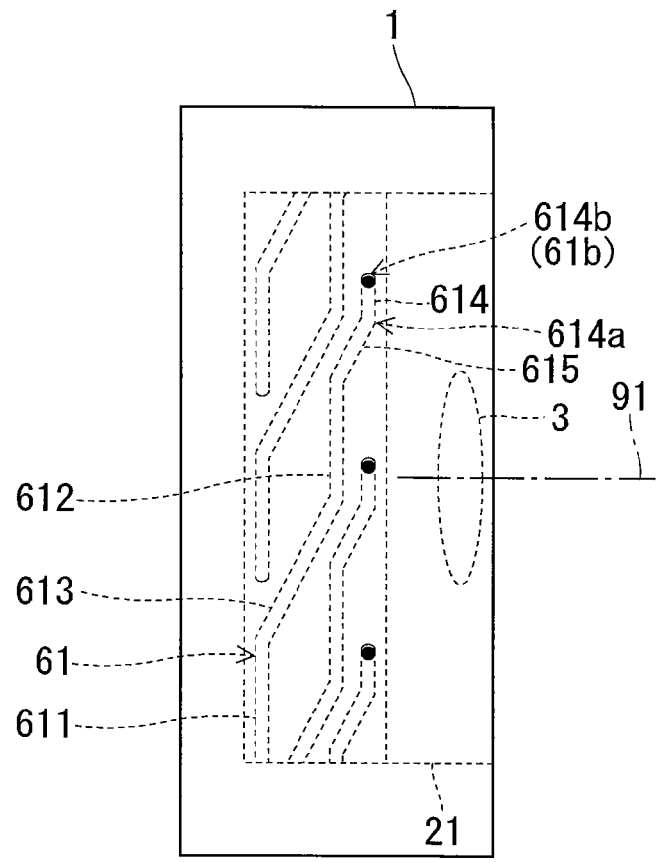
FIG. 7 is a side view of the zoom-type image capture device when the zoom lens stops at a retracted position.

When the protrusion 62 is placed at the end 61b of the guide slot 61 as shown in FIG. 7, the lens barrel 21 of the zoom mechanism 2 has an operating position (collapsed position) with which the device body 1 accommodates the lens barrel 21. In the below, the position of the zoom lens 3 then is referred to as a retracted position.

When the protrusion 62 is placed in a position 61c in the second slot section 612 of the guide slot 61 and which is near the end 612b of the second slot section 612, the lens barrel 21 of the zoom mechanism 2 has an operating position with which the lens barrel 21 slightly projects from the front surface of the device body 1. In the present preferred embodiment, the zoom rate of an image to be captured at this time is set lowest. So, the position of the zoom lens 3 then is a wide end.

The lens barrel 21 rotates about the optical axis 91 in response to the rotation of the motor 22 during power is supplied to the motor 22. This causes the relative movement of the protrusion 62 along the guide slot 61 between the opposite ends 61a and 61b of the guide slot 61. This relative movement of the protrusion 62 defines the position of the lens barrel 21 in the direction of the optical axis 91 is defined, and the position of the zoom lens 3 is defined by the defined position of the lens barrel 21.

In more detail, in the case of the relative movement of the protrusion 62 inside the first slot section 611, the protrusion 62 is caused to move under the guidance of the first slot section 611 in a direction in which the first slot section 611 extends, namely in a direction parallel to the base end 211, or in a direction slightly slanting from the base end 211. So, the lens barrel 21 hardly moves along the optical axis 91 while rotating about the optical axis 91. As a result, the zoom lens 3 hardly moves from the telephoto end.

In the case of the relative movement of the protrusion 62 inside the second slot section 612, the protrusion 62 is caused to move under the guidance of the second slot section 612 in a direction in which the second slot section 612 extends, namely in a direction parallel to the base end 211, or in a direction slightly slanting from the base end 211. So, the lens barrel 21 hardly moves along the optical axis 91 while rotating about the optical axis 91. As a result, the zoom lens 3 hardly moves from the wide end.

In the case of the relative movement of the protrusion 62 inside the third slot section 613, the protrusion 62 is caused to move under the guidance of the third slot section 613 in a direction in which the third slot section 613 extends, namely in an oblique direction from the end 611a of the first slot section 611 to the end 612a of the second slot section 612. So, while rotating about the optical axis 91, the lens barrel 21 moves along the optical axis 91 a distance determined by the amount of rotation of the lens barrel 21. As a result, the zoom lens 3 moves toward the telephoto end or toward the wide end a distance determined by the amount of rotation of the lens barrel 21.

Likewise, in the case of the relative movement of the protrusion 62 inside the fourth slot section 614, the lens barrel 21 hardly moves along the optical axis 91 while rotating about the optical axis 91. As a result, the zoom lens 3 hardly moves from the retracted position.

In the case of the relative movement of the protrusion 62 inside the fifth slot section 615, however, while rotating about the optical axis 91, the lens barrel 21 moves along the optical axis 91 a distance determined by the amount of rotation of the lens barrel 21. As a result, the zoom lens 3 moves toward the retracted position or toward the wide end a distance determined by the amount of rotation of the lens barrel 21.

So, the above-described cam mechanism realizes the lens barrel 21 that is capable of rotating about the optical axis 91 while being capable of moving back and forth along the optical axis 91. Then, the operation of the zoom mechanism 2, namely that of the lens barrel 21 causes the zoom lens 3 to move back and forth along the optical axis 91 of the zoom lens 3.

The rotation of the lens barrel 21 stops when power supply to the motor 22 stops, so that the protrusion 62 stays in any position in the guide slot 61. Then, when pressure acts from the outside of the zoom-type image capture device in this state to the lens barrel 21 in the direction of the optical axis 91, the lens barrel 21 tries to change its operating position by the action of the pressure.

When the pressure acts on the lens barrel 21 with the protrusion 62 staying in a position inside the first slot section 611, however, the protrusion 62 is pressed into contact with the inner wall of the first slot section 611 from a direction substantially perpendicular to the inner wall. As a result, the pressure acting on the lens barrel 21 is counteracted by the protrusion 62. So, there will be little change in the operating position of the lens barrel 21, by which the zoom lens 3 hardly changes its position from the telephoto end.

Likewise, when the pressure acts on the lens barrel 21 with the protrusion 62 staying inside a position in the second slot section 612, the protrusion 62 is pressed into contact with the inner wall of the second slot section 612 from a direction substantially perpendicular to the inner wall. So, there will be little change in the operating position of the lens barrel 21, by which the zoom lens 3 hardly changes its position from the wide end.

That is, when the protrusion 62 stays in a position inside the first slot section 611 or inside the second slot section 612, the zoom mechanism 2 has a predetermined operating position that hardly changes the position of the zoom lens 3 despite the action of the pressure.

When the pressure acts on the lens barrel 21 with the protrusion 62 staying in a position inside the third slot section 613, the protrusion 62 is pressed into contact with the inner wall of the third slot section 613 from a direction slanting from the inner wall. As a result, while moving along the optical axis 91, the lens barrel 21 rotates about the optical axis 91 a degree determined by the amount of movement of the lens barrel 21. So, the zoom lens 3 moves the same amount as the lens barrel 21 toward the wide end.

The guide slots 61 and the protrusion 62 as described above let the cam mechanism have a cam curve that defines the change of the operating position of the lens barrel 21 (namely, the operating position of the zoom mechanism 2) determined by the amount of rotation (angle of rotation) of the lens barrel 21 about the optical axis 91.

Figure 8:
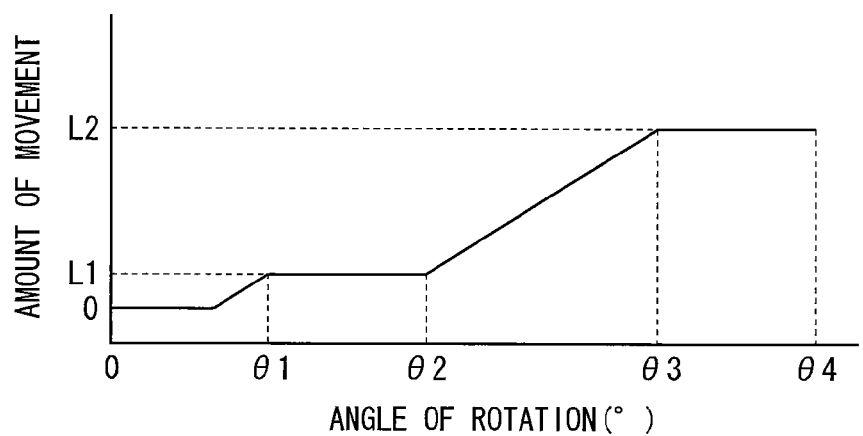
FIG. 8 shows a cam curve of a cam mechanism.

A plot of this cam curve is shown in detail in FIG. 8. In the cam curve shown in FIG. 8, the angle of rotation of the lens barrel 21 with the protrusion 62 placed at the end 61*b* of the guide slot 61 is set at zero degrees, and the position of the zoom lens 3 then is employed as a reference (zero) of the amount of movement of the zoom lens 3.

Figure 6:
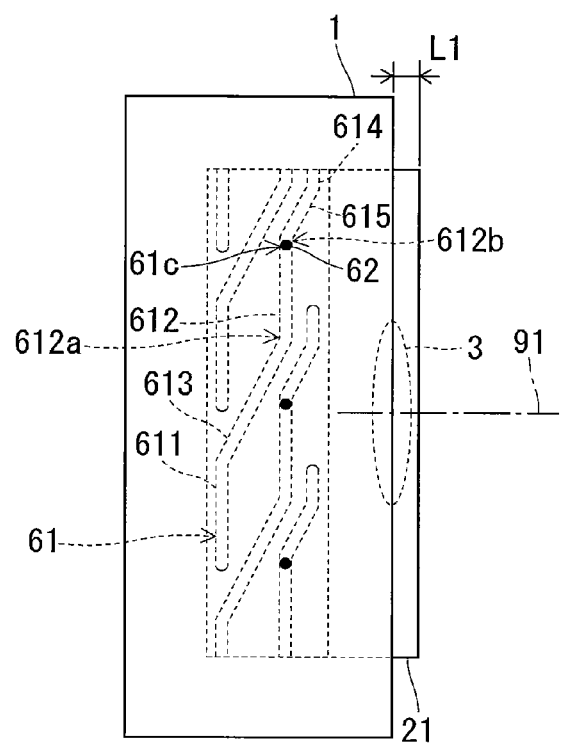
FIG. 6 is a side view of the zoom-type image capture device when the zoom lens stops at a wide end.

When the angle of rotation of the lens barrel 21 is set at an angle between a first angle θ1 at which the protrusion 62 is to reach the end 612*b* of the second slot section 612 and a second angle θ2 at which the protrusion 62 is to reach the end 612*a* of the second slot section 612 (see FIG. 6), the protrusion 62 is placed inside the second slot section 612. So, the amount of movement of the zoom lens 3 hardly changes from a value L1 corresponding to the amount of projection of the lens barrel 21 from the device body 1. That is, the zoom lens 3 hardly changes its position from the wide end.

When the angle of rotation of the lens barrel 21 is set at an angle between a third angle θ3 at which the protrusion 62 is to reach the end 611*a* of the first slot section 611 and a fourth angle θ4 at which the protrusion 62 is to reach the end 611*b* of the first slot section 611 (the end 61*a* of the guide slot 61) (see FIG. 5), the protrusion 62 is placed inside the first slot section 611. So, the amount of movement of the zoom lens 3 hardly changes from a value L2 corresponding to the maximum amount of projection of the lens barrel 21 from the device body 1. That is, the zoom lens 3 hardly changes its position from the telephoto end.

When the angle of rotation of the lens barrel 21 is set at an angle between the second angle θ2 and the third angle θ3, the protrusion 62 is placed inside the third slot section 613. So, the amount of movement of the zoom lens 3 changes between the values L1 and L2 in response to the angle of rotation of the lens barrel 21.

When the angle of rotation of the lens barrel 21 is set at an angle between zero degrees and the first angle θ1 (see FIG. 7), the protrusion 62 is placed inside the fourth slot section 614 or inside the fifth slot section 615. So, the amount of movement of the zoom lens 3 changes between zero and the first value L1 in response to the angle of rotation of the lens barrel 21.

The operational button 12 shown in FIG. 1 gives instructions to the CPU 14 (see FIG. 9) provided in the device body 1. The operational button 12 is formed from a power control button 5 for instructing the CPU 14 to power the zoom-type image capture device on or off, and a zoom button 4 for instructing the CPU 14 to operate the zoom mechanism 21. The zoom button 4 includes a first operational part 41 for instructing the CPU 14 to cause the zoom lens 3 to move toward the telephoto end, and a second operational part 42 for instructing the CPU 14 to cause the zoom lens 3 to move toward the wide end.

When the power control button 5 is operated to power the zoom-type image capture device on, the zoom lens 3 moves from the retracted position to a position between the wide and telephoto ends (a position of the zoom lens 3 with which the zoom-type image capture device can capture images. This position may be the wide end, for example). When the power control button 5 is operated to power the zoom-type image capture device off, the zoom lens 3 moves from a rest position at the time of power-off to the retracted position.

Figure 3:
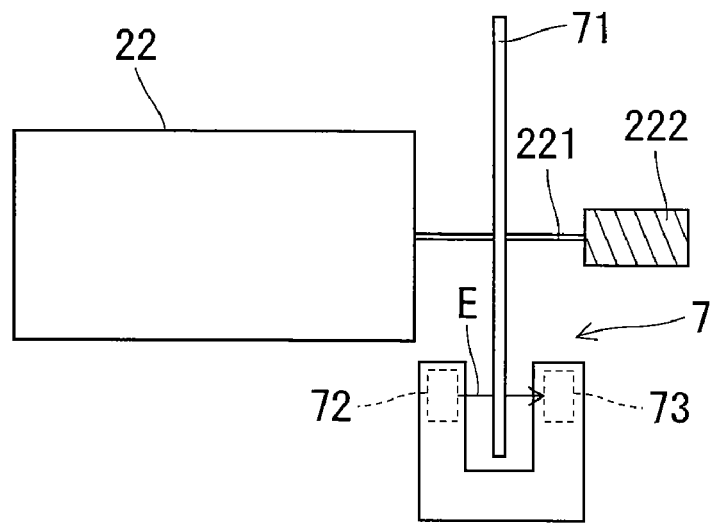
FIG. 3 is a side view of a motor and a pulse encoder provided in the zoom-type image capture device.

As shown in FIG. 3, the motor 22 is provided with the pulse encoder 7 for determining the amount of rotation of the motor 22. The pulse encoder 7 includes a rotary plate 71, a light emitting part 72, and a light receiving part 73.

Figure 4:
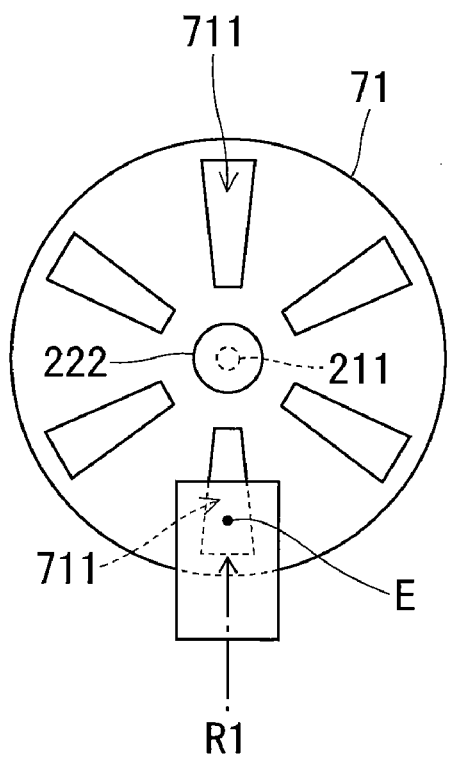
FIG. 4 is a front view of the pulse encoder.

As shown in FIG. 4, the rotary plate 71 is fixed to the rotary shaft 221 of the motor 22, and is given a plurality of slits 711 radially extending with respect to the rotary shaft 221. So, in response to the rotation of the motor 22, the rotary plate 71 rotates the same amount as the motor 22, by which the slits 711 rotate about the rotary shaft 221.

The light emitting part 72 and the light receiving part 73 are so arranged that, each time one of the slits 711 passes a position R1 defined between the light emitting part 72 and the light receiving part 73 during the rotation of the rotary plate 71, the slit 711 passing the position R1 allows light E emitted from the light emitting part 72 and traveling toward the light receiving part 73 to pass therethrough. Thus, as the rotary plate 71 rotates, an optical pulse is generated in synchronization with a point in time at which the slit 711 is passing the position R1, and the generated optical pulse is received by the light receiving part 73.

A photointerrupter may be employed as the pulse encoder 7. In this case, a light emitting diode and a photo transistor are used as the light emitting part 72 and the light receiving part 73 respectively.

The pulse encoder 7 further includes a counter (not shown) for counting the number of optical pulses received by the light receiving part 73. The counter increases the number of optical pulses when the motor 22 rotates forward to cause the zoom lens 3 to move toward the telephoto end. The counter decreases the number of optical pulses when the motor 22 rotates backward to cause the zoom lens 3 to move toward the wide end. So, the pulse encoder 7 acquires a counted number determined by the amount of rotation of the motor 22 as information about the amount of movement determined by the amount of movement of the zoom lens 3.

The counted number acquired by the pulse encoder 7 is given to the CPU 14 as shown in FIG. 9. Then, based on the counted number given from the pulse encoder 7, the CPU 14 knows the position of the zoom lens 3.

A plurality of rest positions in which the zoom lens 3 is to stop in the absence of instructions from the zoom button 4 (hereinafter referred to as "predetermined rest positions") are defined between the telephoto and the wide end. Counted numbers to be acquired when the zoom lens 3 reaches the corresponding predetermined rest positions are stored in advance in the memory 16 as rest position information. These pieces of rest position information include one piece of rest position information that indicates a rest position of the zoom lens 3 when the zoom mechanism 2 reaches the above-described predetermined operating position. This piece of rest position information is stored in the memory 16 particularly as specific rest position information.

When the zoom button 4 instructs the CPU 14 to stop the zoom mechanism 2, namely when the zoom button 4 is released from its pressed state, the CPU 14 makes the driving IC 15 control the amount of rotation of the motor 22 based on a counted number acquired from the pulse encoder 7 and the rest position information stored in the memory 16, so that the zoom lens 3 stops at one of the predetermined rest positions.

When the zoom lens 3 stops at this predetermined rest position thereafter, the CPU 14 determines whether or not the zoom mechanism 2 has reached the predetermined operating position based on the counted number given from the pulse encoder 7 and the specific rest position information stored in the memory 16. When determining that the zoom mechanism 2 has reached the predetermined operating position, the CPU 14 detects this state as a specific halt state.

The CPU 14 controls power supply from the power supply circuit 8 to the pulse encoder 7 based on whether or not the specific halt state is detected.

Figure 10:
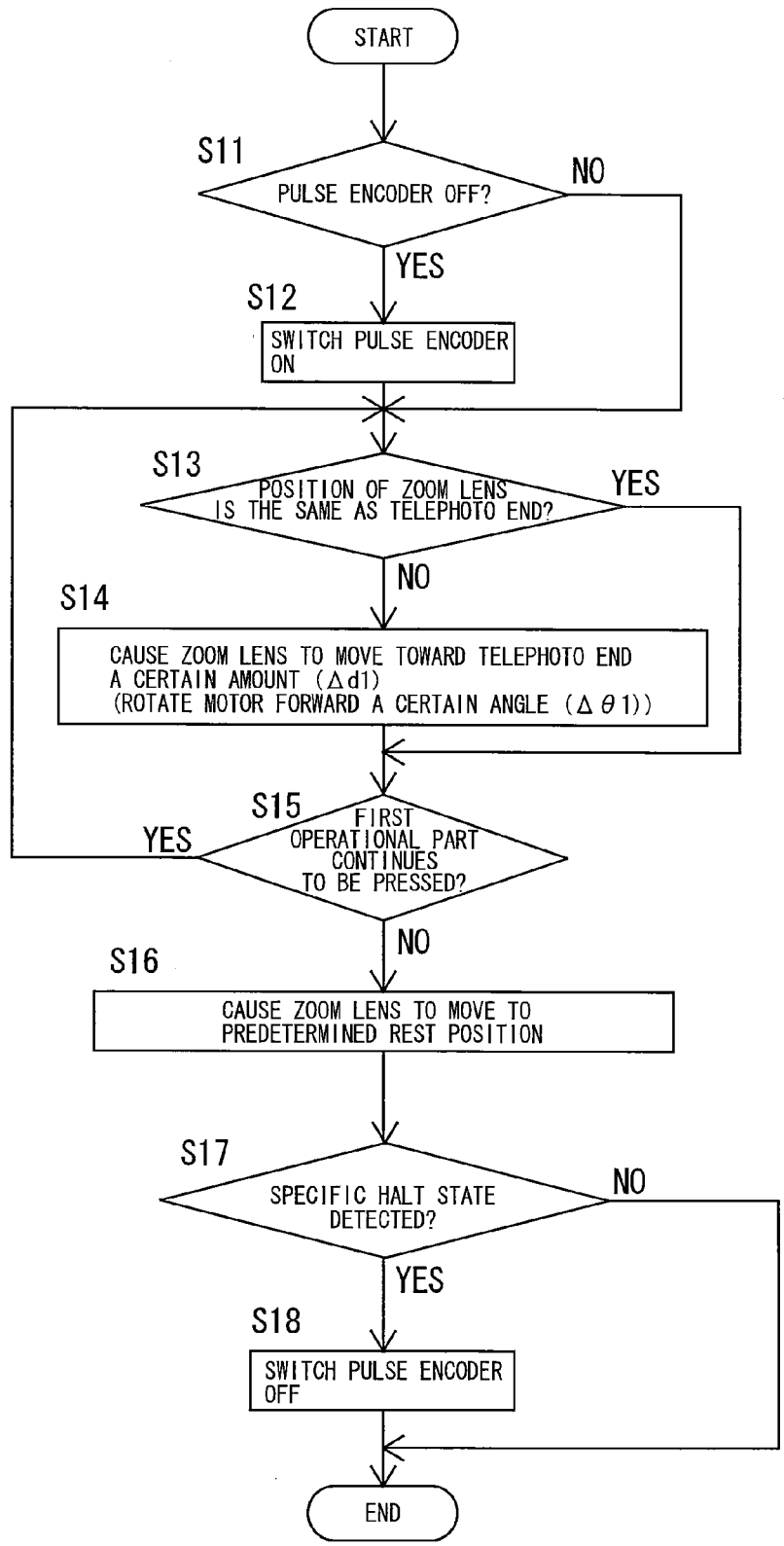
FIG. 10 is a flow diagram explaining control of power supply to the pulse encoder when the zoom lens is caused to move toward the telephoto end.
Figure 11:
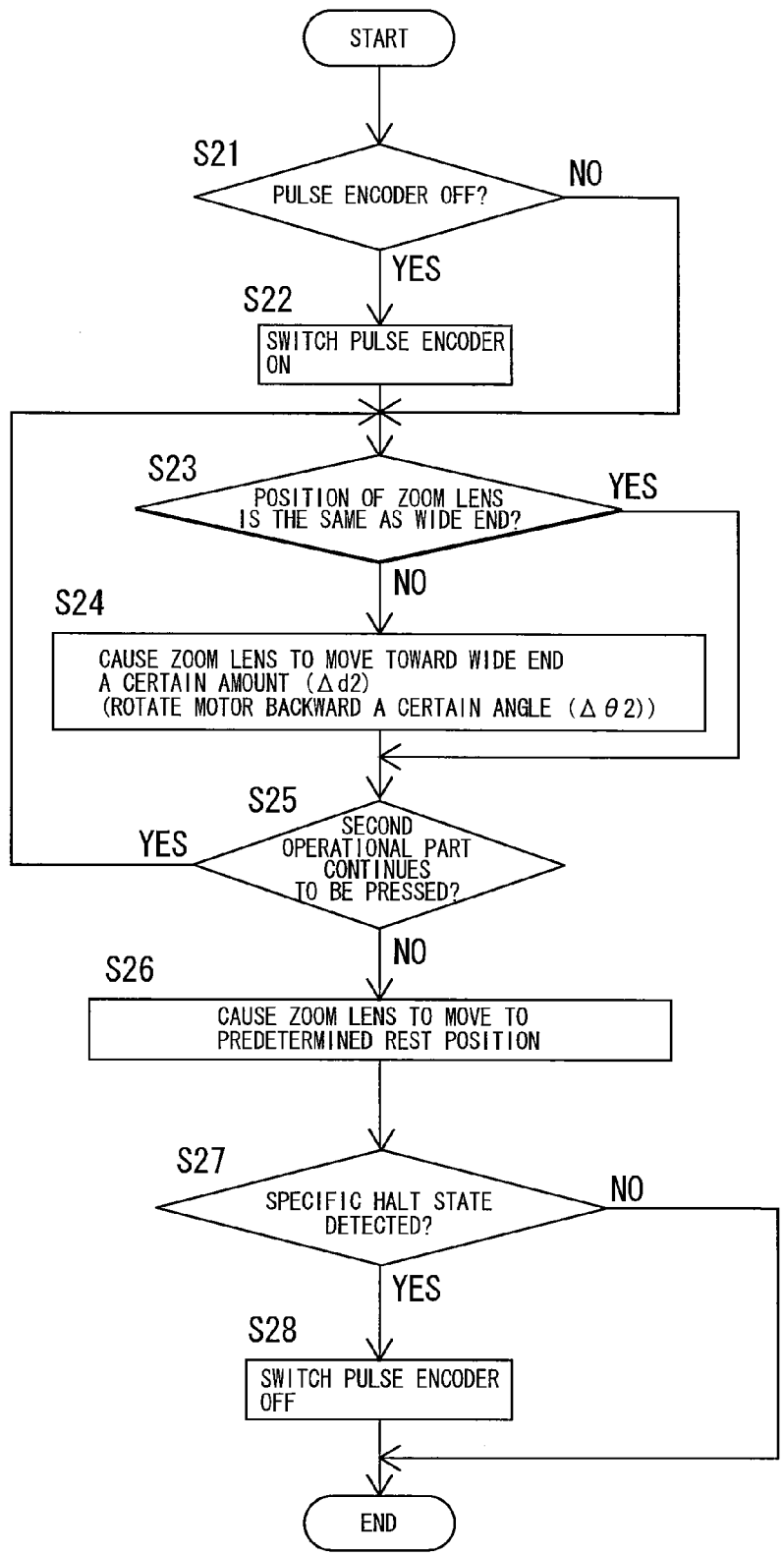
FIG. 11 is a flow diagram explaining control of power supply to the pulse encoder when the zoom lens is caused to move toward the wide end.

Control of power supply to the pulse encoder 7 is described in detail with reference to the flow diagrams shown in FIGS. 10 and 11. FIG. 10 is a flow diagram explaining the flow of control of power supply when the first operational part 41 of the zoom button 4 is pressed. FIG. 11 is a flow diagram explaining the flow of control of power supply when the second operational part 42 of the zoom button 4 is pressed.

When the first operational part 41 of the zoom button 4 is pressed to cause the zoom lens 3 to move toward the telephoto end, the CPU 14 first determines in step S11 whether or not power supply from the power supply circuit 8 to the pulse encoder 7 is stopped, namely whether or not the pulse encoder 7 is OFF as shown in FIG. 10.

When making a positive answer in step S11, the CPU 14 starts to supply power from the power supply circuit 8 to the pulse encoder 7 to switch the pulse encoder 7 on in step S12. After step S12, the control of power supply goes to step S13.

In contrast, the pulse encoder 7 is already ON when the CPU 14 makes a negative answer in step S11. In this case, the control of power supply bypasses step S12 and goes directly to step S13.

In step S13, the CPU 14 determines whether or not the position of the zoom lens 3 has reached the telephoto end.

When making a negative answer step S13, the CPU 14 makes the driving IC 15 rotate the motor 22 forward a certain angle (Δθ1), so that the zoom lens 3 is caused to move toward the telephoto end a certain amount (Δd1) in step S14. After step S14, the control of power supply goes to step S15.

In contrast, the zoom lens 3 cannot move further when the CPU 14 makes a positive answer in step S13. In this case, the control of power supply bypasses step S14 and goes directly to step S15.

In step S15, the CPU 14 determines whether or not the first operational part 41 of the zoom button 4 continues to be pressed.

When the CPU 14 makes a positive answer in step S15, the control of power supply returns to step S13. In this case, the control of power supply from step S13 to step S15 is repeated until the CPU 14 makes a negative answer in step S15. When the CPU 14 makes a negative answer in step S15, the control of power supply goes to step S16.

In step S16, the CPU 14 makes the driving IC 15 control the angle of rotation of the motor 22, so that the zoom lens 3 is caused to move to a predetermined rest position that is closest to the zoom lens 3 at a time when the CPU 14 makes a negative answer in step S15.

Next, the CPU 14 determines in step S17 whether or not the CPU 14 has detected the specific halt state. The specific halt state is detected when the zoom lens 3 stops at the telephoto end, namely when the protrusion 62 stops in the first slot section 611.

When making a positive answer in step S17, the CPU 14 stops power supply from the power supply circuit 8 to the pulse encoder 7 in step S18. Then, the control of power supply is completed.

In contrast, when the CPU 14 makes a negative answer in step S17, the control of power supply is completed with power supply from the power supply circuit 8 to the pulse encoder 7 maintained.

When the second operational part 42 of the zoom button 4 is pressed to cause the zoom lens 3 to move toward the wide end, the CPU 14 first determines in step S21 whether or not power supply from the power supply circuit 8 to the pulse encoder 7 is stopped, namely whether or not the pulse encoder 7 is OFF as shown in FIG. 11.

When making a positive answer in step S21, the CPU 14 starts to supply power from the power supply circuit 8 to the pulse encoder 7 to switch the pulse encoder 7 on in step S22. After step S22, the control of power supply goes to step S23.

In contrast, the pulse encoder 7 is already ON when the CPU 14 makes a negative answer in step S21. In this case, the control of power supply bypasses step S22 and goes directly to step S23.

In step S23, the CPU 14 determines whether or not the position of the zoom lens 3 has reached the wide end.

When making a negative answer step S23, the CPU 14 makes the driving IC 15 rotate the motor 22 backward a certain angle (Δθ2), so that the zoom lens 3 is caused to move toward the wide end a certain amount (Δd2) in step S24. After step S24, the control of power supply goes to step S25.

In contrast, the zoom lens 3 cannot move further when the CPU 14 makes a positive answer in step S23. In this case, the control of power supply bypasses step S24 and goes directly to step S25.

In step S25, the CPU 14 determines whether or not the second operational part 42 of the zoom button 4 continues to be pressed.

When the CPU 14 makes a positive answer in step S25, the control of power supply returns to step S23. In this case, the control of power supply from step S23 to step S25 is repeated until the CPU 14 makes a negative answer in step S25. When the CPU 14 makes a negative answer in step S25, the control of power supply goes to step S26.

In step S26, the CPU 14 makes the driving IC 15 control the angle of rotation of the motor 22, so that the zoom lens 3 is caused to move to a predetermined rest position that is closest to the zoom lens 3 at a time when the CPU 14 makes a negative answer in step S25.

Next, the CPU 14 determines in step S27 whether or not the CPU 14 has detected the specific halt state. This specific halt state is detected when the zoom lens 3 stops at the wide end, namely when the protrusion 62 stops in the second slot section 612.

When making a positive answer in step S27, the CPU 14 stops power supply from the power supply circuit 8 to the pulse encoder 7 in step S28. Then, the control of power supply is completed.

In contrast, when the CPU 14 makes a negative answer in step S27, the control of power supply is completed with power supply from the power supply circuit 8 to the pulse encoder 7 maintained.

In the zoom-type image capture device described above, the pulse encoder 7 acquires information about the amount of movement (counted number) that is determined by the amount of movement of the zoom lens 3 when the zoom lens 3 moves. Then, the position of the zoom lens 3 is known based on the counted number as acquired. So, the pulse encoder 7 should be in a ready state to acquire a counted number when there is a fear of the position of the zoom lens 3 being changed by the action of the above-mentioned pressure, namely when the zoom lens 3 stops at a position between the telephoto end and the wide end.

In the specific halt state in which the zoom mechanism 2 stops at the predetermined operating position, however, the zoom lens 3 hardly changes its position despite the action of the pressure. So, in this case, the motor 22 hardly rotates, and it is very unlikely that the pulse encoder 7 will acquire a counted number. Thus, in this case, there will be no shortage in the information about the amount of movement required to know the position of the zoom lens 3 even when the pulse encoder 7 is not placed in a ready state to acquire a counted number.

In the above-described zoom-type image capture device, power supply from the power supply circuit 8 to the pulse encoder 7 is stopped in the specific halt state in which the zoom mechanism 2 stops at the predetermined operating position. This reduces power to be consumed by the pulse encoder 7.

The structure of each part of the present invention is not limited to that shown in the preferred embodiment described above. Various modifications may be devised within the technical scope defined in claims. In the preferred embodiment described above, the guide slots 61 are defined in such a way that the operating position of the zoom mechanism 2 with the zoom lens 3 stopping at each of the telephoto end and the wide end serves as the predetermined operating position, to which the present invention is not intended to be confined.

By way of example, the guide slots 61 may be defined in such a way that only the operating position of the zoom mechanism 2 with the zoom lens 3 stopping at either the telephoto end or the wide end serves as the predetermined operating position. As another example, the guide slots 61 may be defined in such a way that the operating position of the zoom mechanism 2 with the zoom lens 3 stopping at a position different from the wide end and the telephoto end serves as the predetermined operating position.

Figure 12:
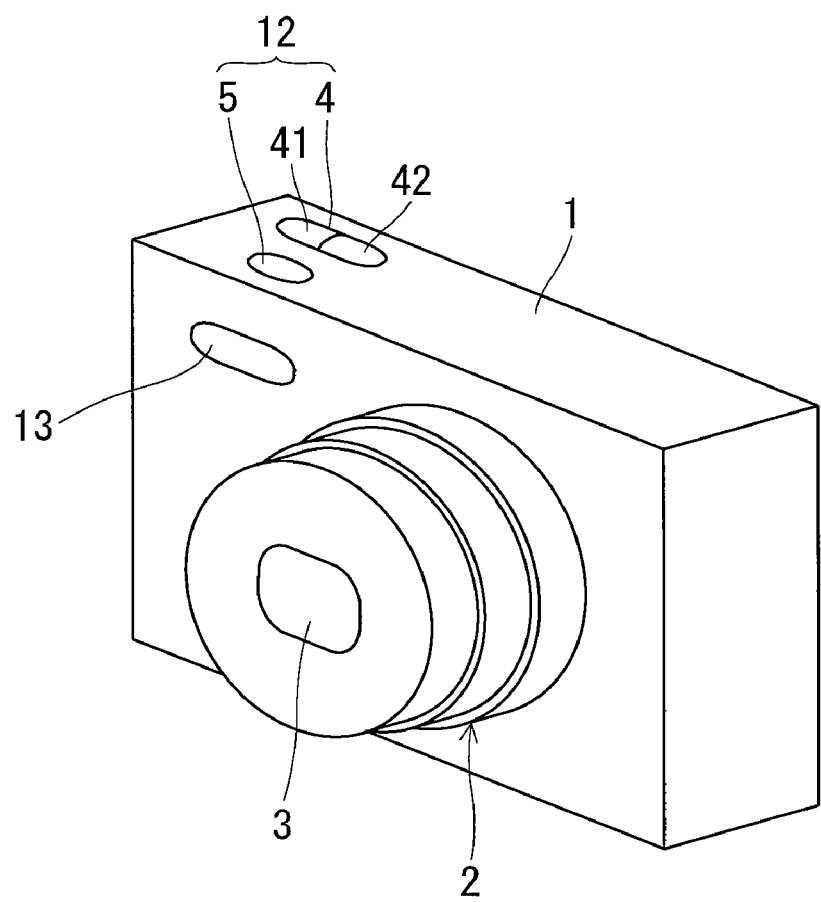
FIG. 12 is a perspective view of an example of a modification of the zoom-type image capture device.

The applicability of the present invention is not limited to the zoom-type image capture device in which the zoom mechanism 2 includes only one lens barrel 21 as shown in FIG. 2. The present invention may also be applied to a zoom-type image capture device shown in FIG. 12. In the zoom-type image capture device shown in FIG. 12, the zoom mechanism 2 includes a plurality of telescopically coupled lens barrels, adjacent ones of which are coupled by a cam mechanism.

The invention claimed is:

1. An image capture device, comprising:
a zoom lens provided to a device body through a zoom mechanism, the zoom lens being caused by the operation of the zoom mechanism to move back and forth along the optical axis of the zoom lens, the zoom mechanism includes a lens barrel to which the zoom lens is fixed;
an information acquisition part which acquires information about the amount of movement determined by the amount of movement of the zoom lens;
a power supply part which supplies power to the information acquisition part;
an operational part which gives instructions to operate the zoom mechanism;
a first controller which controls the operation of the zoom mechanism;
a second controller which controls power supply from the power supply part to the information acquisition part; and
a state detection part which detects a specific halt state in which the zoom mechanism stops the movement of the zoom lens when the zoom mechanism is in any one of a plurality of predetermined operating positions, wherein each of the predetermined operating positions being such that the zoom lens hardly changes its position despite the action of external force,
wherein the first controller being adapted to move the zoom mechanism to a predetermined rest position that is closest to the zoom lens, when the operational part gives an instruction to stop the zoom mechanism, and
wherein the second controller being adapted to stop power supply from the power supply part to the information acquisition part in the process of transferring the zoom lens along the optical axis when the state detection part detects the specific halt state, when the predetermined rest position is one of the predetermined operating positions.

2. The image capture device according to claim 1, wherein the state detection part includes:
a storage part containing position information stored in advance therein, the position information indicating the position of the zoom lens when the zoom mechanism is in the predetermined operating position; and
a determination part which determines whether or not the zoom mechanism has reached the predetermined operating position based on the information about the amount of movement acquired from the information acquisition part and the position information stored in the storage part, the determination being made when the operational part gives instructions to stop the operation of the zoom mechanism, and
when the determination part determines that the zoom mechanism has reached the predetermined operating position, the state detection part detects this state as the specific halt state.

3. The image capture device according to claim 1, wherein
the lens barrel being capable of rotating about the optical axis of the zoom lens while being capable of moving back and forth along the optical axis, and
the device body and the lens barrel are coupled to each other by a cam mechanism, the cam mechanism having a cam curve that defines the change of the operating position of the zoom mechanism determined by the amount of rotation of the lens barrel about the optical axis.

4. The image capture device according to claim 1, wherein the controller stops power supply from the power supply part to the information acquisition part when the zoom lens has reached at least a wide end or a telephoto end.

5. The image capture device according to claim 1, wherein the zoom lens is caused to move back and forth along the optical axis of the zoom lens by driving of a motor, and the information acquisition part includes a pulse encoder for acquiring the number of pulses determined by the amount of rotation of the motor, the acquired number of pulses serving as the information about the amount of movement.

* * * * *